(12) United States Patent
Burgbacher et al.

(10) Patent No.: US 8,262,491 B2
(45) Date of Patent: Sep. 11, 2012

(54) DRIVESHAFT ASSEMBLY AND METHOD FOR ASSEMBLING DRIVESHAFT ASSEMBLY

(75) Inventors: Martin Burgbacher, Troy, MI (US); Volkhard Scharpf, Hickory, NC (US)

(73) Assignee: GKN Driveline Newton, LLC, Auburn Hills, MI (US)

( * ) Notice: Subject to any disclaimer, the term of this patent is extended or adjusted under 35 U.S.C. 154(b) by 337 days.

(21) Appl. No.: 12/458,764

(22) Filed: Jul. 22, 2009

(65) Prior Publication Data

US 2010/0022317 A1  Jan. 28, 2010

Related U.S. Application Data

(60) Provisional application No. 61/129,881, filed on Jul. 25, 2008.

(51) Int. Cl.
  *F16C 3/02* (2006.01)
(52) U.S. Cl. .................................................. 464/183
(58) Field of Classification Search .......... 464/182, 464/183; 403/265, 270–272, 359.1–359.6
See application file for complete search history.

(56) References Cited

U.S. PATENT DOCUMENTS

| | | | | |
|---|---|---|---|---|
| 2,380,952 | A * | 8/1945 | Dewey | 464/183 |
| 4,421,497 | A * | 12/1983 | Federmann et al. | 464/183 |
| 6,062,982 | A * | 5/2000 | Cartwright | 403/270 |
| 6,287,209 | B1 * | 9/2001 | Nakajima et al. | 464/183 |
| 6,364,780 | B1 * | 4/2002 | Amborn et al. | 464/182 |
| 6,367,680 | B1 * | 4/2002 | Duggan | |
| 6,792,660 | B1 * | 9/2004 | Breese | 464/182 |
| 6,855,061 | B2 | 2/2005 | Simboli | |
| 6,891,137 | B2 | 5/2005 | Yablochnikov | |
| 6,928,712 | B2 | 8/2005 | Cermak | |
| 7,004,840 | B1 | 2/2006 | Duggan et al. | |
| 7,044,860 | B2 | 5/2006 | Smith | |
| 7,080,437 | B2 | 7/2006 | da Silva et al. | |
| 7,163,462 | B2 * | 1/2007 | Okude et al. | 464/183 |
| 7,347,784 | B2 | 3/2008 | Keller et al. | |
| 7,543,678 | B2 * | 6/2009 | Rodriguez | |
| 2003/0045366 | A1 * | 3/2003 | Loughrin et al. | 464/182 |
| 2003/0125118 | A1 * | 7/2003 | Raghavan et al. | 464/182 |
| 2008/0296078 | A1 * | 12/2008 | Capito | |

OTHER PUBLICATIONS

Friction welding—Wikipedia, the free encyclopedia, printed from website: http://en.wikipedia.org/wiki/Friction_welding on May 11, 2010, 3 pages.

* cited by examiner

*Primary Examiner* — Gregory Binda
*Assistant Examiner* — Josh Skroupa
(74) *Attorney, Agent, or Firm* — Jennifer M. Brumbaugh

(57) ABSTRACT

A driveshaft assembly for a vehicle includes a tube having a first end and a second end. The driveshaft assembly also includes a first member configured to transmit torque. A portion of the first member is provided within the first end of the tube and is coupled to an inner surface of the tube by a weld. The driveshaft assembly also includes a second member configured to transmit torque. A portion of the second member is provided within the second end tube and is coupled to the inner surface of the tube by a weld. The first and second members are configured to have axes of rotation that are collinear with an axis of rotation of the tube such that when the first and second members are coupled to the tube, no further alignment between the tube, the first member, and the second member is required.

21 Claims, 4 Drawing Sheets

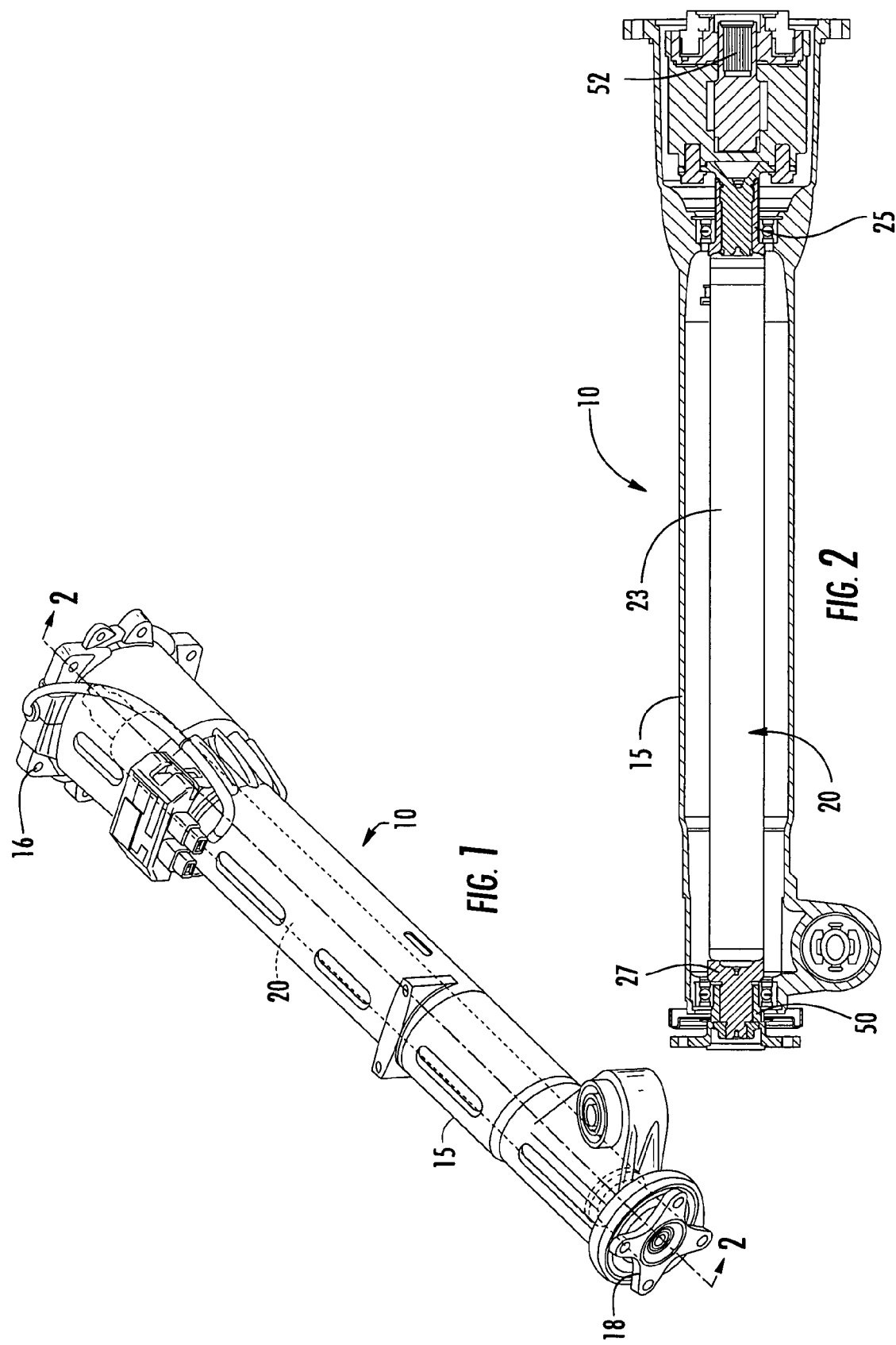

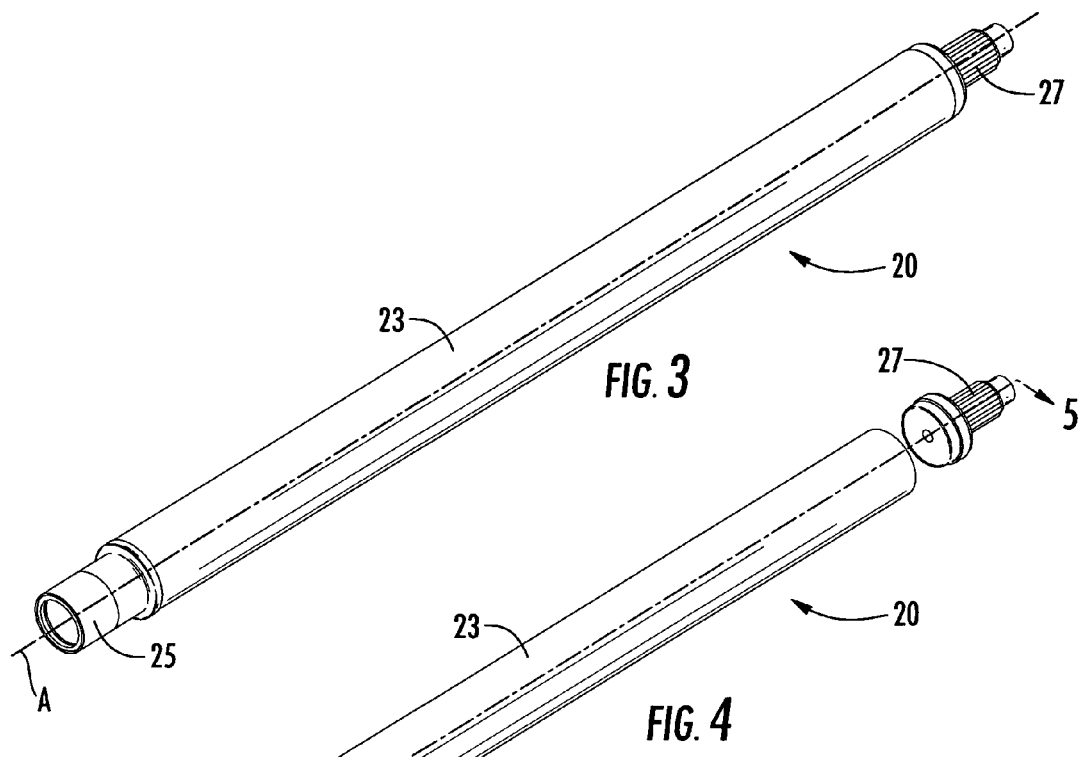
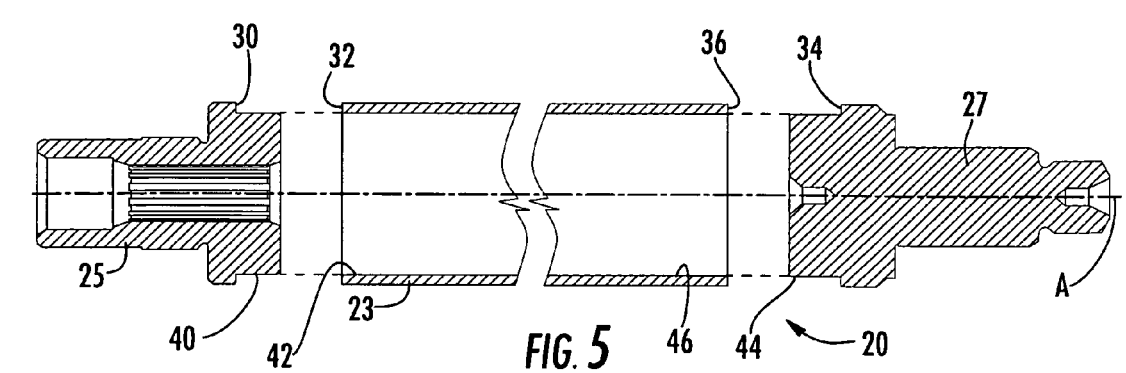

DRIVESHAFT ASSEMBLY AND METHOD FOR ASSEMBLING DRIVESHAFT ASSEMBLY

CROSS-REFERENCE TO RELATED APPLICATIONS

This application claims the benefit of and priority to U.S. Patent Application No. 61/129,881 filed Jul. 25, 2009, the entire disclosure of which is incorporated by reference herein.

BACKGROUND

The present application relates generally to the field of vehicle drive train systems which include a driveshaft to transmit torque from the transmission to the axle or differential. More specifically, the present application relates to an improved construction of a driveshaft assembly and a method of manufacturing the improved driveshaft assembly.

Vehicles include a drive train system to transmit the output torque from the engine or transmission to the appropriate axle or to the differential and then to the axle. A drive train system utilizes a torque tube assembly that includes a driveshaft assembly therein. Driveshaft assemblies typically include a driveshaft tube having end members coupled to each end of the tube, one of which is configured to engage the output shaft of the engine or transmission and one of which is configured to engage the input shaft of a differential. The end members allow for torque to be transferred from the transmission to the differential or axle through the driveshaft assembly. The rear differential assembly turns the rotation transmitted from the driveshaft assembly, which is about the fore-aft axis, into rotation of the wheels, which is about the cross-car axis.

A disadvantage of conventional driveshaft assemblies is the need to balance each driveshaft assembly subsequent to assembly due to the misalignment between the components of the driveshaft. That is, the center of mass of each of one or both of the end members may be offset from the axis of rotation of the driveshaft. Such misalignment may result from a variance in the concentricity between the end members of the driveshaft assembly and the tube, which results from a combination of component tolerances and manufacturing process tolerances of the assembly.

One contributor to the misalignment is the process conventionally used to couple the end members to the driveshaft tube. End members typically have been coupled to the driveshaft tube using a friction welding process, in which the components are brought into contact with each other and at least one of the components is rotated to generate sufficient friction between the components to cause localized melting of the metal, after which the metal is allowed to resolidify to create a solid metal joint between the components. During this process, component dimensions may change, which may lead to variance of the center of mass and/or misalignment between the members with respect to the axis of rotation of the driveshaft assembly.

The process of balancing the driveshaft assembly after the friction welding process is relatively costly and time consuming. The balancing process involves spinning the driveshaft at specified revolutions per minute (RPM) and fixing weights to certain locations through a process such as welding. In the event that the balancing process does not fully balance the driveshaft assembly, undesirable noise and/or vibration may be produced during use of the driveshaft in the vehicle.

Accordingly, it would be desirable to provide an improved method for manufacturing a driveshaft assembly for use in vehicles that is more cost-efficient and less time consuming than conventional methods of assembly. It would also be desirable to provide an improved driveshaft assembly that aids in joining the components of the driveshaft together. It would be desirable to provide a method and/or driveshaft assembly that includes any one of these or other advantageous features as will be apparent to those reviewing the present disclosure.

SUMMARY

An exemplary embodiment relates to a driveshaft assembly for a vehicle that includes a tube having a first end and a second end. The driveshaft assembly also includes a first member configured to transmit torque. A portion of the first member is provided within the first end of the tube and is coupled to an inner surface of the tube by a weld. The driveshaft assembly also includes a second member configured to transmit torque. A portion of the second member is provided within the second end tube and is coupled to the inner surface of the tube by a weld. The first and second members are configured to have axes of rotation that are collinear with an axis of rotation of the tube such that when the first and second members are coupled to the tube, no further alignment between the tube, the first member, and the second member is required.

Another exemplary embodiment relates to a driveshaft assembly for a vehicle that includes a tube having a first end and second end. The driveshaft assembly also includes a first member having a first end configured to transmit torque and a second end configured to couple to a surface at the first end of the tube by a weld. The driveshaft assembly also includes a second member having a first end configured to transmit torque and a second end configured to couple to a surface at the second end of the tube by a weld. The first member and the second member are configured to have axes of rotation that are collinear with an axis of rotation of the tube such that when the first member and second member are coupled to the tube, no further alignment between the tube, the first member, and the second member is required.

Another exemplary embodiment relates to a method of manufacturing a driveshaft assembly that includes providing a generally cylindrical tube having a first open end, a second open end, an outer surface, and a central longitudinal axis. The method also includes securing the tube at a first location proximate the first end and at a second location proximate the second end. The method further includes inserting a portion of a first member into the first open end of the tube such that the portion of the first member contacts an inner surface of the tube and inserting a portion of a second member into the second open end of the tube such that the portion of the second member contacts an inner surface of the tube. The method further includes securing the first and second members to the tube to prevent movement of the first and second members relative to the tube and welding the first and second members to the tube. The first member and the second member are configured to have axes of rotation that are collinear with the central longitudinal axis of the tube such that the driveshaft assembly may be assembled without the need for a separate balancing step.

BRIEF DESCRIPTION OF THE DRAWINGS

FIG. 1 is a perspective view of an exemplary embodiment of a torque tube assembly.

FIG. 2 is a section view of the embodiment of the torque tube assembly shown in FIG. 1.

FIG. 3 is a perspective view of an exemplary embodiment of a driveshaft assembly, configured for use with a torque tube assembly such as that shown in FIG. 1.

FIG. 4 is an exploded perspective view of the embodiment of the driveshaft assembly shown in FIG. 3.

FIG. 5 is an exploded cross-sectional view of the embodiment of the driveshaft assembly shown in FIG. 3.

DETAILED DESCRIPTION

Figure 6:
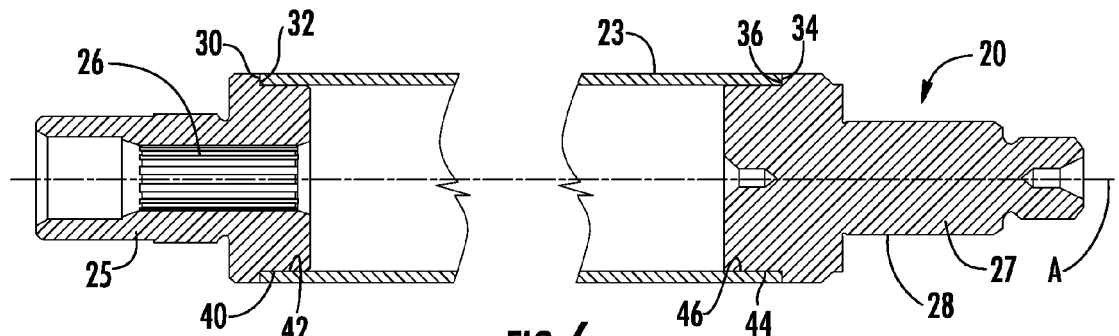
FIG. 6 is a cross-sectional view of the embodiment of the driveshaft assembly shown in FIG. 3.

Referring to FIG. 1, an exemplary embodiment of a torque tube assembly 10 for a vehicle is illustrated. Torque tube assembly 10 includes a driveshaft assembly 20, a housing assembly 15, a first end 16 (e.g., a transmission attachment end), and a second end 18 (e.g., a differential attachment end). The vehicle transmission (not shown) connects to the transmission attachment end 16 to transmit torque from the transmission to the driveshaft assembly 20 of the torque tube assembly 10. The vehicle differential (not shown) connects to the differential attachment end 18 to transmit torque from the driveshaft assembly 20 to the differential and then to the axle of the vehicle.

Referring to FIGS. 2-4, a cross-sectional view of the torque tube assembly 10 (taken across line 2-2 in FIG. 1) is illustrated according to an exemplary embodiment. Driveshaft assembly 20 includes a driveshaft tube 23, a first driveshaft end member 25, and a second driveshaft end member 27. Torque tube assembly 10 also includes a splined hub 50 (which engages second driveshaft end member 27) and a splined shaft 52 (which engages first driveshaft end member 25). Splined shaft 52 is also engaged by the output shaft of the transmission and transmits torque from the transmission to the driveshaft assembly 20. Driveshaft assembly 20 transmits torque to the splined hub 50, which in turn transmits torque to the input shaft of the differential.

Referring to FIGS. 3 and 4, driveshaft assembly 20 is constructed so that there is a common longitudinal axis of rotation (denoted "A" in the FIGS.) between driveshaft tube 23, first driveshaft end member 25, and second driveshaft end member 27. Axis of rotation A is critical to the balance of the driveshaft assembly, for if the center of mass of one part is offset with respect to the axis of rotation of the assembly, imbalance will be generated during rotation of the assembly. For example, for an embodiment for a specific vehicle application, a driveshaft assembly having a run-out greater than 0.08 mm may produce imbalance, where the run-out may be measured as the surface variation of the engaging diameters of the end members, such as the engaging surface 26 of first driveshaft end member 25 and/or the engaging surface 28 of the second driveshaft end member 27, when rotated relative to the outer diameter of the driveshaft tube or the axis of rotation of the driveshaft assembly. For this specific application, a driveshaft assembly manufactured using a conventional design and process produces a driveshaft assembly having an average run-out of 0.20 mm, thus necessitating a secondary process to balance the driveshaft assembly. By using the process and design disclosed herein (e.g., as described with respect to the embodiment shown in FIGS. 3 and 4), a driveshaft assembly with a repeatable run-out below the 0.08 mm threshold may be obtained, therefore not requiring additional balancing.

It should be noted that those skilled in the art will recognize that the actual values for the magnitudes of run-out or variance that produces imbalance for rotating driveshaft assemblies varies from vehicle to vehicle. The specific values disclosed in this application illustrate the possible variances of specifically designed and manufactured driveshaft assemblies and the variances of other embodiments configured as disclosed in this application are not limited by the specific values disclosed.

It should be noted that although the driveshaft assembly 20 as illustrated in FIGS. 3 and 4 is shown as being configured for use within torque tube assembly 10 (i.e., first and second end members 25, 27 of the driveshaft assembly 20 are configured to engage and transmit torque to splined shaft 52 and splined hub 50, respectively), according to other exemplary embodiments, a driveshaft assembly such as that discussed herein may be used without a torque tube assembly and/or may be configured to engage and/or transmit torque to other vehicle components. For example, a driveshaft assembly may, either alone or in conjunction with other vehicle components, transmit torque from one end member through the driveshaft tube to the other end member. For example, an end of such a driveshaft assembly may be configured to engage and transmit torque to or from an engine component, transmission component, differential component, or other vehicle component that drives or is driven by torque. According to these other exemplary embodiments, the first and second end members 25, 27 may be configured to have any desired geometry (e.g., the geometry may differ from that shown in the accompanying drawings), and may be configured to accommodate any of a variety of vehicle and customer configurations.

According to an exemplary embodiment, driveshaft tube 23 is made from a high strength steel preferably manufactured through a process such as mandrel forming to produce a seamless tube, which is then cut to length. According to other exemplary embodiments, the driveshaft tube may not be a seamless tube, and may be formed using any suitable process. According to other exemplary embodiments, a driveshaft tube may be made from aluminum, low strength steel, or other suitable metals or metal alloys and may be manufactured using other suitable processes such as roll forming or extruding. The first driveshaft end member 25 and second driveshaft end member 27 may be made from steel or another suitable material (e.g., aluminum, composite materials, etc.). According to an exemplary embodiment, the first and second driveshaft end members 25 and 27 may be manufactured using a forging process, after which they may be machined to create the dimensional accuracy required. According to other exemplary embodiments, driveshaft end members may be manufactured using other suitable processes (e.g., casting, etc.).

Referring to FIG. 5, a cross-sectional view of driveshaft assembly 20 (taken along line 5-5 in FIG. 4) is illustrated. FIG. 6 illustrates a cross-sectional view of an assembled driveshaft assembly. Driveshaft assembly 20 is constructed to eliminate the need for balancing, which is a relatively costly and time consuming step. The machining of first driveshaft end member 25 and second driveshaft end member 27 creates the dimensional accuracy required to bring its center of mass close to its rotation axis A, by aligning the concentricity of the stepped sections of each end member, as will be described below. This includes the machining of coupling surfaces 40 and 44 of first driveshaft end member 25 and second driveshaft end member 27, respectively, which improves the concentricity of each end member to driveshaft tube 23. The machining of coupling surfaces 30 and 34 reduces the surface profile variance of each, which reduces the gap between the coupling surface of the end member to the coupling surface of the tube, creating a stronger weld condition.

For example, for an embodiment for a specific vehicle application a first driveshaft end 25 as disclosed may produce a repeatable run-out of 0.02 mm, where the run-out may be the measured variation of the coupling surface 40 of the first driveshaft end 25 when rotated relative to the engaging surface 26 (i.e., surface that engages the first component of the torque tube assembly) of the first driveshaft end 25. Additionally, for this embodiment for a specific vehicle application, a second driveshaft end 27 may produce a repeatable run-out of 0.02 mm, where the run-out may be the measured variation of the coupling surface 44 of the second driveshaft end 27 when rotated relative to the engaging surface 28 (i.e., surface that engages the second component of the torque tube assembly) of the second driveshaft end 27. The run-out (e.g., the surface variation) may also be the measured variation of the coupling surface of the drive shaft end when rotated relative to another diametral surface or to the axis of rotation of the drive shaft end.

It should be noted that those skilled in the art will recognize that the actual values for the magnitudes of run-out or variance that produces imbalance for rotating driveshaft assemblies varies from vehicle to vehicle. The actual values disclosed in this application illustrate the possible variances of specifically designed and manufactured driveshaft assemblies and the variances of other embodiments configured as disclosed in this application are not limited by the actual values disclosed.

During the assembly process of driveshaft assembly 20, driveshaft tube 23 is clamped in place using a fixture (according to an exemplary embodiment, driveshaft tube 23 is clamped proximate its ends). First driveshaft end member 25 is then coupled to the first end of the driveshaft tube 23 (e.g., by way of a press fit) such that surface 30 of first driveshaft end member 25 contacts or engages coupling surface 32 of driveshaft tube 23 and coupling surface 40 of first driveshaft end member 25 contacts or engages coupling surface 42 of driveshaft tube 23. First driveshaft end member 25 may have a chamfer on the leading edge of coupling surface 40 to allow for easier and accurate coupling to driveshaft tube 23. The relatively tight engagement between surfaces 40 and 42 is intended to maintain concentricity between the components, and the contact between surfaces 30 and 32 is intended to aid in minimizing variations in the length of the driveshaft assembly that may otherwise result from a subsequent welding process to permanently couple the components together.

Also referring to FIGS. 5 and 6, second driveshaft end member 27 is coupled to the second end of the driveshaft tube 23 in a manner similar to that described with respect to first driveshaft end member 25. Surface 34 of second driveshaft end member 27 contacts or engages coupling surface 36 of driveshaft tube 23 and coupling surface 44 of second driveshaft end member 27 contacts or engages coupling surface 46 of driveshaft tube 23. Second driveshaft end member 27 may have a chamfer on the leading edge of coupling surface 44 to allow for easier and accurate coupling to driveshaft tube 23.

According to an exemplary embodiment, first and second driveshaft end members 25, 27 are coupled to driveshaft tube 23 substantially simultaneously. According to other exemplary embodiments, one of the first and second end members may be coupled to the driveshaft tube before the other is coupled thereto.

Figure 7:
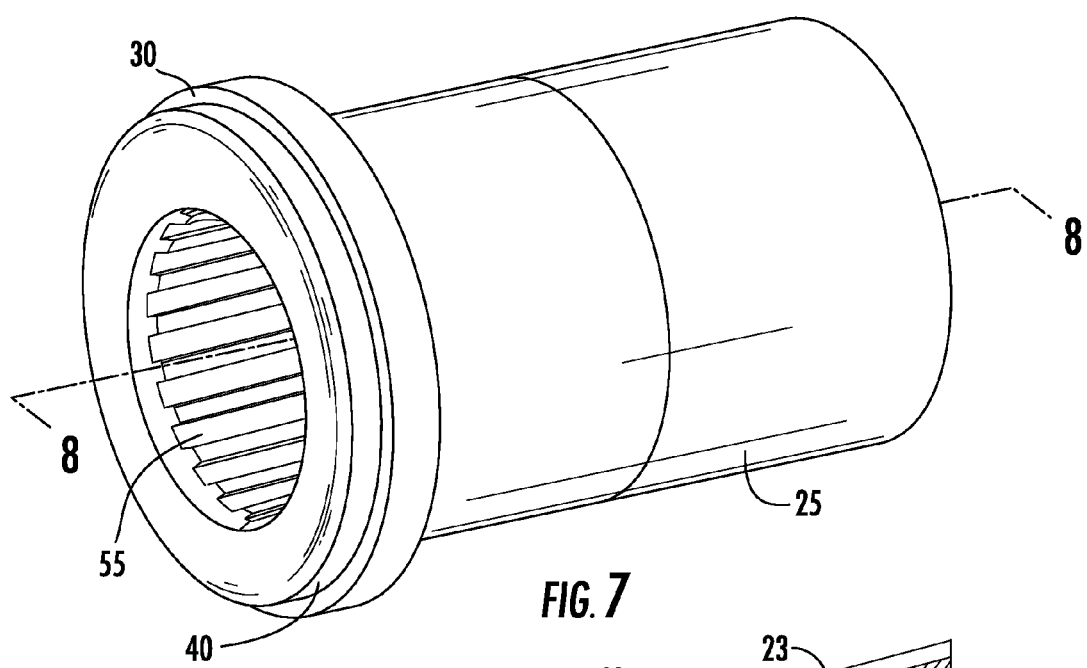
FIG. 7 is a perspective view of an exemplary embodiment of a first driveshaft end member configured for coupling to a transmission output, and is used to construct an exemplary driveshaft assembly.

Referring to FIG. 7, first driveshaft end member 25 is illustrated, and includes coupling surfaces 30 and 40 and splined section 55. According to an exemplary embodiment, coupling surface 30 may be machined to provide dimensional precision in the form of a tight and repeatable run-out, which improves the quality and strength of the joint between first driveshaft end member 25 and driveshaft tube 23 during a subsequent joining operation (e.g., a laser welding operation). Additionally, coupling surface 40 may be machined to provide dimensional precision in the form of a controlled diameter with an accurate (i.e., tight) concentricity with respect to the other stepped sections of first driveshaft end member 25. The controlled concentricity of the interface (i.e., coupling) sections of first driveshaft end member 25 provides for its concentricity to driveshaft tube 23 on assembly and thus improves the balance of the driveshaft assembly 20. Splined section 55 may be formed during forging or another process and may be used to transmit torque from splined shaft 52 of torque tube assembly 10 to driveshaft assembly 20.

According to other embodiments, first driveshaft end member 25 may be constructed such that splined section 55 is broached (i.e., the process of shearing material off of the work-piece by passing the sheared surface across a plurality of blades or chisels, where the blades have varying lengths each remove a small amount of material) following the forging process to improve the quality of the splines, or first driveshaft end member 25 may be constructed with splined section 55 on an outside diameter, to engage a splined hub instead of a splined post. Additionally, splined section 55 of first driveshaft end member 25 may transmit torque directly from the engine or transmission assembly, to driveshaft assembly 20.

Figure 8:
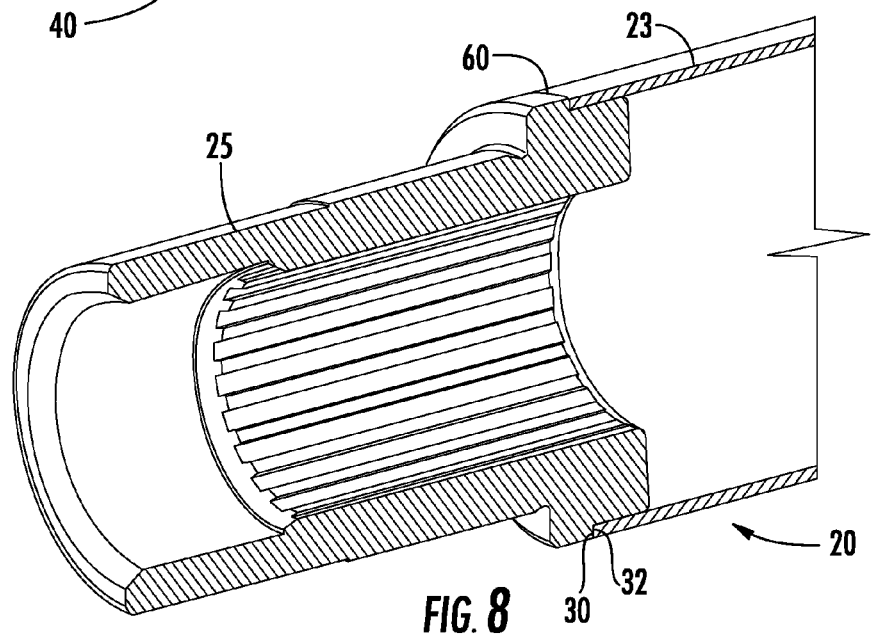
FIG. 8 is a partial section view of the embodiment of the driveshaft assembly shown in FIG. 3, showing the first driveshaft end member configured for coupling to a differential input.

Referring to FIG. 8, first driveshaft end member 25 (the cross-section of which is taken along line 8-8 in FIG. 7) is illustrated in greater detail coupled to driveshaft tube 23. Following the press fit coupling of first driveshaft end member 25 to driveshaft tube 23, which is fixtured in place, first driveshaft end member 25 is held in place by exerting a force in the axial direction of the tube to maintain contact between coupling surfaces 30 and 32. According to an exemplary embodiment, coupling surfaces 30 and 32 are joined using a seam weld 60. According to an exemplary embodiment, seam weld 60 may be formed using a laser welding process, which minimizes the heat introduced into the assembly during the process. This minimization of weld heat mitigates the amount of weld heat distortion that driveshaft assembly 20 undergoes, allowing for first driveshaft end member 25 to remain concentric to driveshaft tube 23 after the welding operation is complete. According to other embodiments, the coupling surfaces may be joined using other types of weld joints and/or using other weld processes (e.g., gas-metal arc welding, capacitance-discharge, high-voltage resistance welding or other useful methods).

Figure 9:
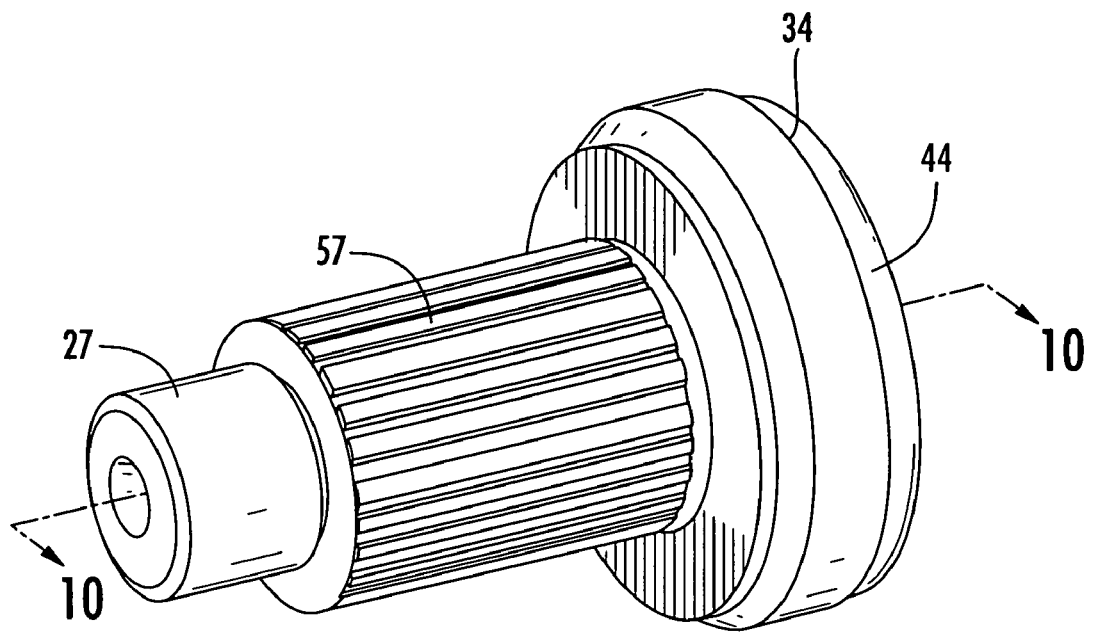
FIG. 9 is a perspective view of an exemplary embodiment of a second driveshaft end member configured for coupling to a differential input, and is used to construct an exemplary driveshaft assembly.

Referring to FIG. 9, second driveshaft end member 27 is illustrated, and includes coupling surfaces 34 and 44 and splined section 57. According to an exemplary embodiment, coupling surface 34 may be machined to provide dimensional precision in the form of a tight and repeatable run-out, which improves the quality and strength of the laser welding joint between the second driveshaft end member 27 and the driveshaft tube 23. Additionally, coupling surface 44 may be machined to provide dimensional precision in the form of a controlled diameter with an accurate (i.e., tight) concentricity with respect to the other stepped sections of the second driveshaft end member 27. The controlled concentricity of the sections of the second driveshaft end member 27 provides for its concentricity to the driveshaft tube 23 on assembly and thus improves the balance of the driveshaft assembly 20. The splined section 57 may be formed during forging and may be used to transmit torque to the splined hub 50 of torque tube assembly 10.

According to other embodiments, second driveshaft end member 27 may be constructed such that the splined section 57 is broached following the forging process, to improve the quality of the splines; or second driveshaft end member 27 may be constructed with a splined section 57 on an inside diameter, to engage a splined post instead of a splined hub. Additionally splined section 57 of second driveshaft end member 27 may transmit torque directly to a differential or to an axle assembly.

Figure 10:
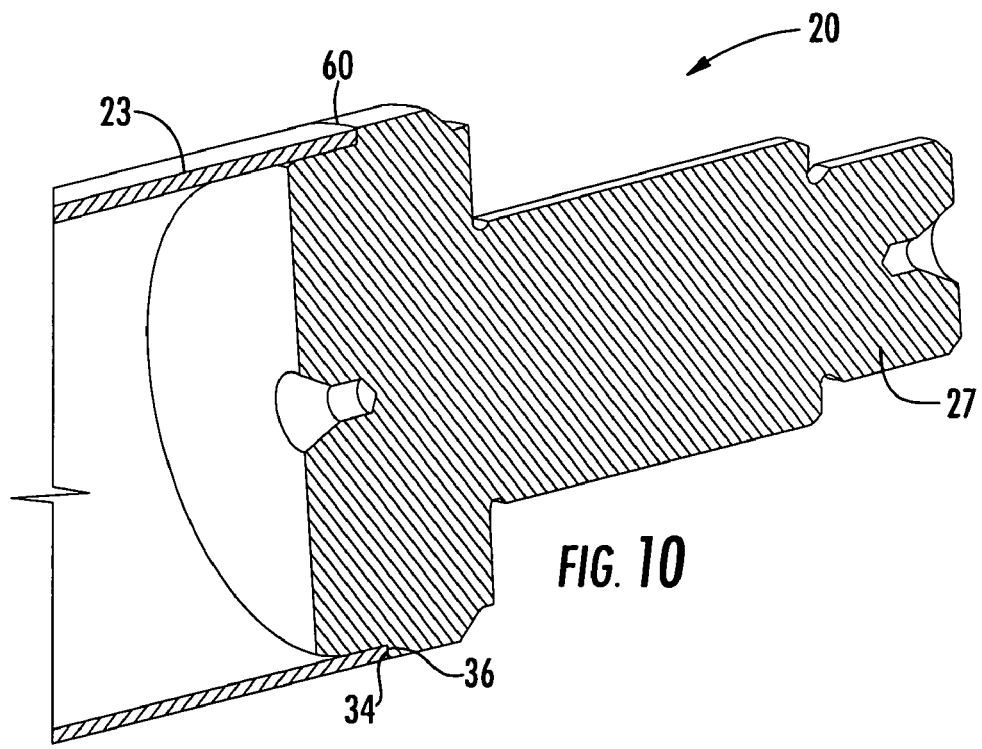
FIG. 10 is a partial section view of the embodiment of the driveshaft assembly shown in FIG. 3, showing the second driveshaft end member configured for coupling to a transmission output.

Referring to FIG. 10, second driveshaft end member 27 (the cross-section of which is taken along line 10-10 in FIG. 9) is illustrated in greater detail coupled to driveshaft tube 23. Following the press fit coupling of second driveshaft end member 27 to driveshaft tube 23, which is fixtured in place, second driveshaft end member 27 is held in place by exerting a force in the axial direction of the tube to maintain contact between coupling surfaces 34 and 36. According to an exemplary embodiment, coupling surfaces 34 and 36 are joined using a seam weld 60. According to an exemplary embodiment, seam weld 60 may be formed using a laser welding process, which minimizes the heat introduced into the assembly during the process. This minimization of weld heat mitigates the amount of weld heat distortion driveshaft assembly 20 undergoes, allowing for second driveshaft end member 27 to remain concentric to driveshaft tube 23 after the welding operation is complete. According to other embodiments, the coupling surfaces may be joined using other types of weld joints and/or using other weld processes (e.g., gas-metal arc welding, capacitance-discharge, high-voltage resistance welding, or other useful methods).

Also referring to FIGS. 8 and 10, mitigating the weld heat distortion allows for maintaining the concentricity established through the press-fit operation of the machined driveshaft end members to the driveshaft tube 23. Laser welding introduces a lower amount of heat input during the fusion process, than does conventional welding (i.e., gas-metal arc welding). The less heat input that is introduced during welding, the less distortion the fused members undergo as the parts cool down. The combination of decreased part variance and decreased manufacturing assembly variance eliminates the need to balance driveshaft assembly 20, which reduces both assembly cost and assembly time.

The configurations and arrangements of the end members and the driveshaft tube are intended to reduce or eliminate the need for post-assembly balancing of the driveshaft assembly. The engagement of the parts during assembly (e.g., as a result of the press-fit arrangement of the parts) and the fact that other joining processes may be used in place of friction welding (e.g., laser welding, etc.) reduces or eliminates the contribution that the assembly process may have on the concentricity or balance of the part. By controlling the dimensional tolerance of the individual components, the overall concentricity of the driveshaft tube may be improved over more conventional assembly processes, which reduces or eliminates the need to balance each driveshaft assembly after the assembly process is completed.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the driveshaft assembly as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:
1. A driveshaft assembly for a vehicle comprising:
a tube having a first end and a second end;
a first member configured to transmit torque, wherein a portion of the first member is provided within the first end of the tube and the portion of the first member is coupled to an inner surface of the tube; and a second member configured to transmit torque, wherein a portion of the second member is provided within the second end of the tube and the portion of the second member is coupled to an inner surface of the tube;

wherein the portion of the first member and the portion of the second member each have a variation of less than 0.20 mm relative to the inner surfaces of the tube;

wherein the first member and the second member are configured to have axes of rotation that are collinear with an axis of rotation of the tube such that when the first member and second member are coupled to the tube, no further alignment between the tube, the first member, and the second member is required.

2. The driveshaft assembly of claim 1, wherein the first member is configured to engage a first component of a torque tube assembly.

3. The driveshaft assembly of claim 2, wherein the first member includes external splines for engaging the first component of the torque tube assembly.

4. The driveshaft assembly of claim 2, wherein the second member is configured to engage a second component of the torque tube assembly.

5. The driveshaft assembly of claim 4, wherein the second member includes internal splines for engaging the second component of the torque tube assembly.

6. The driveshaft assembly of claim 1, wherein the first member includes a surface configured to engage the first end of the tube.

7. The driveshaft assembly of claim 1, wherein the second member includes a surface configured to engage the second end of the tube.

8. The driveshaft assembly of claim 1, wherein the first member and the second member are configured to be press-fit with the tube such that the first member and the second member are secured to the tube before a welding operation.

9. The driveshaft assembly of claim 1, wherein the portion of the first member and the portion of the second member each have a variation of less than 0.08 mm relative to the axis of rotation of the tube after being coupled to the tube.

10. A driveshaft assembly for a vehicle configured to transfer torque from a first component of a torque tube assembly to a second component of the torque tube assembly, the driveshaft assembly comprising:

a tube having a first end and a second end;

a first member having a first end with an engaging surface configured to transmit torque to the first component and a second end configured to be coupled to a substantially parallel surface at the first end of the tube; and a second member having a first end with an engaging surface configured to transmit torque to the second component and a second end configured to be coupled to a substantially parallel surface at the second end of the tube;

wherein the first member and the second member are configured to have axes of rotation that are collinear with an axis of rotation of the tube when the first member and second member are coupled to the tube;

wherein the engaging surface of the first end of the first member and the engaging surface of the first end of the second member each have a surface variation of less than 0.20 mm relative to the axis of rotation of the tube after being coupled to the tube.

11. The driveshaft assembly of claim 10, wherein the first end of the second member is configured for engaging the first component of a torque tube assembly.

12. The driveshaft assembly of claim 11, wherein the first end of the second member includes external splines for engaging the second component of the torque tube assembly.

13. The driveshaft assembly of claim 11, wherein the first end of the first member is configured for engaging the second component of a torque tube assembly.

14. The driveshaft assembly of claim 13, wherein the first end of the first member includes internal splines for engaging the first component of the torque tube assembly.

15. The driveshaft assembly of claim 11, wherein the first ends of the first and second members includes splines for engaging the torque tube assembly.

16. The driveshaft assembly of claim 10, wherein the surface at the first end of the tube is substantially perpendicular to the axis of rotation of the tube.

17. The driveshaft assembly of claim 10, wherein the surface at the second end of the tube is substantially perpendicular to the axis of rotation of the tube.

18. The driveshaft assembly of claim 10, wherein a portion of the second end of the first member is provided within the first end of the tube.

19. The driveshaft assembly of claim 10, wherein a portion of the second end of the second member is provided within the second end of the tube.

20. The driveshaft assembly of claim 10, wherein the first member and the second member are configured to be press-fit with the tube such that the first member and the second member are secured to the tube before a welding operation.

21. The driveshaft assembly of claim 10, wherein the first end of the first member and the first end of the second member each have a variation of less than 0.08 mm relative to the axis of rotation of the tube after being coupled to the tube.

* * * * *